United States Patent [19]

Sano et al.

[11] Patent Number: 5,002,714

[45] Date of Patent: * Mar. 26, 1991

[54] PROCESS FOR PRODUCING HIGHLY ORIENTED POLYETHYLENE MATERIAL

[75] Inventors: Akira Sano, Kawasaki; Hirofumi Kamiishi, Yokohama; Yoshimu Iwanami, Yokohama; Shigeki Yokoyama, Yokohama; Kazuo Matsuura, Tokyo, all of Japan

[73] Assignee: Nippon Oil Co., Ltd., Tokyo, Japan

[*] Notice: The portion of the term of this patent subsequent to Nov. 7, 2006 has been disclaimed.

[21] Appl. No.: 453,708

[22] Filed: Dec. 20, 1989

[30] Foreign Application Priority Data

Dec. 27, 1988 [JP] Japan .................................. 63-330686

[51] Int. Cl.$^5$ ....................... B29C 43/22; B29C 47/00

[52] U.S. Cl. .................................. 264/119; 264/120; 264/126

[58] Field of Search ........................ 264/119, 120, 126

[56] References Cited

U.S. PATENT DOCUMENTS 4,879,076 11/1989 Sano et al. ............................ 264/28

Primary Examiner—Mary Lynn F. Theisen
Attorney, Agent, or Firm—Bucknam and Archer

[57] ABSTRACT

A process for the production of polyethylene materials oriented at a high level is disclosed in which a selected ethylene polymer as produced is extruded or rolled at a temperature lower than its melting point and subsequently subjected to stretching. The polymer is from 5 to 50 dl/g at 135° C. in decalin in intrinsic viscosity and smaller than 60 Å in crystal size on a plane (110) in the diffraction pattern.

12 Claims, No Drawings

PROCESS FOR PRODUCING HIGHLY ORIENTED POLYETHYLENE MATERIAL

BACKGROUND OF THE INVENTION

1. Field of the Invention

This invention relates to a process for producing polyethylene materials of improved mechanical strength and elastic modulus characteristics by a specified mode of molding.

2. Description of the Prior Art

An ethylene polymer of an extremely high molecular weight, commonly called ultrahigh molecular weight polyethylene, is well known to have superior resistance to impact and to abrasion and peculiar self-lubricity. This type of polyethylene enjoys high reputation as an engineering plastic material and finds extensive application to hoppers, silos, gears, linings and the like for use in various sectors of industry ranging from food processing, civil engineering, chemistry, agriculture and mining to sports and leisure supplies Polyethylene of ultrahigh molecular weight is literally high in melting viscosity and hence difficult to extrude or stretch under usual molding conditions. This is interpreted to mean that the benefits of such polymer cannot be attained to a full extent.

In Japanese Patent Laid-Open Publication No. 56-15408 it has been proposed to stretch a certain gel derived from a decalin dope of ultrahigh molecular weight polyethylene, thereby forming highly strong, elastic fibers. This dope however can only be formed with a limited polymer concentration, say 3% by weight of a polyethylene having weight-average molecular weight of $1.5 \times 10^6$ or 1% by weight of a polyethylene having a similar molecular weight of $4 \times 10^6$. Such prior stretching has a drawback in that it requires much solvent and much care in dissolving the polymer in the solvent, leading to lesser economy and inconvenient handling.

Alternatively, polyethylenes of ultrahigh molecular weights have been oriented to a high degree as disclosed for instance in Japanese Patent Laid-Open Publication No. 59-187614, No. 60-15120 and No. 60-97836 and Preprints of the Society of High Polymers, Japan, vol. 34, p. 873 (1985). In such prior modes of molding a dilute solution of that polymer in xylene, decalin, kerosine or a similar solvent is cooled or crystallized isothermally to form a single crystal mat which is thereafter extruded or stretched in a solid phase. This is still uneconomical with much solvent necessary for mat formation.

Furthermore, Japanese Patent Laid-Open Publication No. 63-41512 and No. 63-66207 teaches stretching ultrahigh molecular weight polyethylene without resorting to dissolution or melting. This leaves the magnitude of orientation unsolved.

SUMMARY OF THE INVENTION

It has now been found that polyethylene materials of enhanced orientation characteristics can be obtained by a selected mode of molding of a specified polyethylene of a particulate, ultrahigh molecular type.

The present invention seeks to provide a new process for producing polyethylene materials which have high orientation and excel in mechanical strength and elastic modulus. The polyethylene materials obtainable by the invention are typical of a fiber, film and sheet.

According to one aspect of the invention, there is provided a process for producing polyethylene materials having a high degree of orientation, which comprises solid phase-extruding a particulate polyethylene at a temperature of lower than the melting point thereof and subsequently stretching the preform, the particulate polyethylene having an intrinsic viscosity of from 5 to 50 dl/g at 135° C. in decalin and a crystal size of not more than 60 Å in a direction normal to a (110) plane in the diffraction pattern.

According to another aspect of the invention, there is provided a process for producing polyethylene materials having a high degree of orientation, which comprises rolling a particulate polyethylene at a temperature of lower than the melting point thereof and subsequently stretching the preform, the particulate polyethylene having the same intrinsic viscosity and crystal size as does in the first-mentioned process.

DETAILED DESCRIPTION OF THE INVENTION

A process of the present invention is characterized by molding ultrahigh molecular weight polyethylene as produced, thereby providing highly oriented fibers, films and sheets. The products thus obtained are superior, from a mechanical strength point of view, to those formed by dissolution or melting of the starting polymer.

Importantly, particulate polyethylenes used for purposes of the invention should be selected from those having an intrinsic viscosity of 5 to 50 dl/g at 135° C. in decalin and preferably 8 to 40 dl/g and more preferably 10 to 30 dl/g which correspond in viscosity-average molecular weight to $50 \times 10^4$ to $1,200 \times 10^4$, $90 \times 10^4$ to $900 \times 10^4$ and $120 \times 10^4$ to $600 \times 10^4$, respectively. Polymers of smaller viscosities than 5 dl/g, i.e. lower molecular weights than about $50 \times 10^4$, would produce a molded article of insufficient orientation and hence poor strength and modulus qualities. Those polymers of greater viscosities than 50 dl/g, i.e. higher molecular weights than about $1,200 \times 10^4$, would be difficult to mold by extrusion or rolling.

Also importantly, the particulate polyethylene according to the invention should have a crystal size of less than 60 Å in a direction normal to a (110) plane in the diffraction pattern and preferably 1 to 60 Å and more preferably 1 to 50 Å. This size is determined in a manner to be described. Polymers exceeding 60 Å would fail to give sufficient stretching, resulting in a product of inadequate strength and modulus properties. Although the exact reasoning is not fully known for the unique stretchability and hence high orientation at a crystal size of smaller than 60 Å, the polymeric particles will presumably have a great area of contact and on exposure to force get intimately contacted.

Polyethylene according to the invention may be derived by homopolymerizing ethylene or copolymerizing the same with an α-olefin in the presence of a selected catalyst later described. Examples of α-olefins include those having a carbon number of 3 to 12 and more preferably 3 to 6, such as propylene, butene-1, 4-methylpentene-1, hexene-1, octene-1, decene-1, dodecene-1 and the like. Particularly preferred are propylene, butene-1, 4-methylpentene-1 and hexene-1. These comonomers may if necessary be combined with dienes such as butadiene, 1,4-hexadiene, vinyl norbornene, ethylidene norbornene and the like. The α-olefin content in the final copolymer is in the range of 0.001 to 10% by mol and preferably 0.01 to 5% and more preferably 0.1 to 1%.

The above catalyst essentially comprises as a solid catalyst component at least one compound containing a transition metal of Groups IV to VI metals of the Periodic Table and optionally an organometallic compound. Specific examples of catalyst components include metallic compounds of titanium, vandium, chromium, zirconium, hafnium and the like. These compounds may be used in combination.

Suitable titanium compounds include for example titanium derivatives such as halides, alkoxy halides, alkoxides, halogen oxides and the like. Tetravalent and trivalent titanium compounds are typified. Tetravalent titanium compounds are those of the formula $$Ti(OR)_n X_{4-n}$$

where R is an alkyl group of a carbon number of 1 to 20 and preferably 1 to 12, or an aralkyl group, X is a halogen atom, and n is $0 < n < 4$. Titanium tetrachloride of those compounds is particularly preferred. Trivalent titanium compounds are those derived by reducing titanium tetrahalides such as titanium tetrachloride and titanium tetrabromide with hydrogen, aluminum, titanium or an organometallic compound of Groups I to III metals, or by reducing tetravalent alkoxytitanium halides of the formula $$Ti(OR)_m X_{4-m}$$

where R is an alkyl group of 1 to 20 carbon atoms, or an aryl or aralkyl group, X is a halogen atom, and m is $0 \leq m \leq 4$, with an organometallic compound of a Groups I to III metal. Tetravalent titanium compounds are most practical as catalyst components for the invention.

Eligible vanadium compounds include for example vanadium halides, vanadium alkoxyhalides, vanadium alkoxids, vanadium oxyhalides and the like. Specific examples are selected from tetravalent vanadium compounds such as vanadium tetrachloride, tetraethoxy vanadium and the like, pentavalent vanadium compounds such as vanadium oxytrichloride, ethoxydichloro vanadyl, triethoxy vanadyl, tributoxy vanadyl and the like and trivalent vanadium compounds such as vanadium trichloride, vanadium triethoxide and the like.

The titanium or vanadium compound specified above may be treated with one or more electron donors They include ethers, thioethers, thiophosphines, stibines, arsines, amines, amides, ketones, esters and the like.

When it is found desirable, such titanium or vanadium compound may be contacted in conventional manner with a magnesium compound. Specific examples of magnesium compounds include metallic magnesium, magnesium hydroxide, magnesium carbonate, magnesium oxide, magnesium fluoride, magnesium chloride, magnesium bromide, magnesium iodide and the like, double salts, double oxides, carbonates, chlorides, hydroxides and the like which contain a metal such as silicon, aluminum or calcium and a magnesium atom, compounds resulting from treatment or reaction of the latter inorganic compounds with an oxygen-containing compound, a sulfur-containing compound, an aromatic hydrocarbon or a halide, and compounds resulting from treating a silicon- or aluminum-containing oxide with either one of the above listed magnesium compounds. In examples of oxygen-containing compounds are included water, organic compounds such as alcohols, phenols, ketones, aldehydes, carboxylates, esters, polysiloxanes, acid amides and the like and inorganic compounds such as metal alkoxides, metal oxychlorides and the like. Sulfur-containing compounds are selected for example from organic compounds such as thiols, thioethers and the like and inorganic compounds such as sulfur dioxide, sulfur trioxide, sulfuric acid and the like. Aromatic hydrocarbons include for example monocyclic and polycyclic hydrocarbon compounds such as benzene, toluene, xylene, anthracene, phenanthrylene and the like. As halides there are suitably employed chlorine, hydrogen chloride, metal chlorides, organic halides and the like.

Various other catalysts may be used which are made up typically of a reaction product of an organic magnesium compound such as a Grignard compound with a titanium compound and also of an organoaluminum compound. Further forms of catalysts are composed of a solid catalyst component having at least magnesium and titanium compounds contained and carried on silica or alumina and of an organoaluminum compound. In those catalysts a titanium compound may be used as an adduct of an organic carboxylate, or an inorganic magnesium-containing compound may be contacted previously with an organic carboxylate. An organoaluminum compound is feasible in the form of an adduct of an organic carboxylate. Those catalysts obtainable in the presence of an organic carboxylate are in all instances eligible for purposes of the invention.

Chromium compounds are typified by Philips catalysts in which a selected chromium oxide is supported on an inorganic carrier. Carriers include silica, alumina, silica-alumina, titania, zirconia, tria and mixtures thereof. Silica and silica-alumina are preferred. Chromium compounds include chromium oxides and compounds which on calcination may partially form a chromium oxide, the latter compounds including chromium halides, chromium oxyhalides, chromium nitrates, chromium acetates, chromium sulfates, chromium alcoholates and the like. Specific examples are selected from chromium trioxide, chromyl chloride, potassium bicarbonate, ammonium chromate, chromium nitrate, chromium acetate, chromium acetylacetate, di-tert-butyl chromate and the like. The chromium compound may be supported on a given carrier as by immersion, solvent distillation, sublimation or the like and should be used in an amount of 0.1 to 10% by weight and preferably 0.3 to 5% and more preferably 0.5 to 3%.

The chromium compound thus carried is calcined to activate usually in a moisture-free, non-reductive atmosphere for instance in the presence of oxygen or an inert gas or in vacuo. Fully dry air is preferably utilized in a fluidized bed. Calcination is effected at higher than 450° C. and preferably from 500° to 900° C. for from several minutes to several hours and preferably from 0.5 to 10 hours. The chromium compound may be adjusted in its catalytic activity, at the time of support or calcination, with the addition of a titanate or a fluorine-containing salt. Reduction is also applicable with carbon monoxide, ethylene, an organoaluminum compound or the like.

Zirconium and hafnium compounds useful in the invention are such having configured a conjugated electron-containing group and represented by the formula $R_a{}^1R_b{}^2MR_c{}^3R_d{}^4$ where M is a zirconium or hafnium atom, $R^1$, $R^2$, $R^3$ and $R^4$ each are a hydrocarbon moiety of 1 to 20 carbon atoms, or a halogen or hydrogen atom, at least one of $R^1$ to $R^4$ being a hydrocarbon moiety, and a, b, c and d are a+b+c+d=4. Hydrocarbon moieties include alkyl, aryl, cycloalkyl, aralkyl, alkoxy and cycloalkadienyl groups, sulfur-containing hydrocarbon and nitrogen-containing hydrocarbon moieties and the like.

Alkyl groups for use as hydrocarbon moieties are selected from methyl, ethyl, propyl, iso-propyl, butyl, hexyl, octyl, 2-ethylhexyl, decyl, oleyl, and like groups, aryl groups from phenyl, tollyl and like groups, cyclcalkyl groups from cyclopentyl, cyclohexyl, cyclooctyl, norbenyl, bicyclononyl and like groups, and aralkyl groups from benzyl, neophil and like groups. Cycloalkadienyl groups include for example cyclopentadienyl, methyl cyclopentadienyl, ethyl cyclopentadienyl, dimethyl cyclopentadienyl, indenyl, tetrahydroindenyl and like groups. In alkoxy groups are included methoxy, ethoxy, propoxy, butoxy and like groups. Sulfur-containing hydrocarbon moieties are chosen from thioethyl, thiophenyl and like groups and nitrogen-containing hydrocarbon moieties from dimethyl amide, dethylamide, dipropylamide and like groups. Various other groups may be applied in which are included unsaturated fatty moieties such as vinyl, alkyl, propenyl, iso-propenyl, 1-butenyl and like groups and unsaturated alicyclic groups such as cyclohexenyl and like groups. Halogen atoms are fluorine, chlorine and bromine.

The zirconium and hafnium compounds may be supported on either one of the carriers listed above.

Organometallic compounds used herein are compounds of Groups I to IV metals commonly accepted as a component for Ziegler type catalysts. Preferred are those compounds of the formula $R_nAlX_{3-n}$ where R is an alkyl group of 1 to 20 carbon atoms, or an aryl or alkoxy group, X is a halogen atom, and n is $0 < n \leq 3$, and of the formula $R_2Z_n$ where R is an alkyl group of 1 to 20 carbon atoms, the substituent being the same or different. The two types of organometallic compounds may be used alone or in combination.

Specific examples of organoaluminum compounds include triethylaluminum, tri-iso-butylaluminum, tri-n-hexylaluminum, diethylaluminum chloride, monoethoxydialkylaluminum, diethoxymonoalkylaluminum and the like. Also preferred are those organoaluminum compounds derived by reacting a trialkylaluminum with water and represented by the formula $$\left(\begin{matrix}R\\|\\Al-O\end{matrix}\right)_n$$

where R is a hydrocarbon group of 1 to 18 carbon atoms, and n is $2 \leq n \leq 100$ and preferably $2 \leq n \leq 50$.

No particular restriction is imposed upon the amount of the organoaluminum compound which however may conveniently be added in the range of 0.1 to 1,000 times per mol of the transition metal used.

Polymerization may be accomplished in a gas phase free from oxygen and water and with or without the use of a solvent inert to a selected catalyst Solvents include aliphatic hydrocarbons such as butane, iso-butane, pentane, hexane, octane, decane, dodecane and the like, alicyclic hydrocarbons such as cyclopentane, cyclohexane and the like, aromatic hydrocarbons such as benzene, toluene and the like and petroleum fractions. Reaction temperatures are at from $-20°$ to $+100°$ C. and preferably from $0°$ to $90°$ C.

The molecular weight of a polymer to be formed may be regulated by means of the temperature and pressure of reaction, the nature and proportion of catalyst or the feed of hydrogen to the reaction system. These parameters are equally applicable as such to crystal size control among which the dependence on reaction pressure is most convenient. Lower pressures will contribute to smaller crystal sizes. To this end reaction pressures range from 0 to 70 kg/cm²G and preferably 0 to 30 kg/cm²G and more preferably 0 to 10 kg/cm²G and still more preferably 0 to 5 kg/cm²G. Most convenient is a pressure up to 2 kg/cm²G.

In accordance with the invention, polymerization may be done by a two-stage or multi-stage reaction with reaction temperatures and hydrogen concentrations varied.

Particulate polyethylenes thus obtained with specified intrinsic viscosity and crystal size characteristics are subjected to the following two modes of molding.

(1) Solid-phase extrusion and subsequent stretching.
(2) Rolling and subsequent stretching.

Referring now to molding (1), particulate polyethylene may usually be extruded as produced but should preferably be pre-compressed to facilitate extrusion. Pre-compression is effected by taking the polymer into a solid-phase extruder equipped with a cylinder and thereafter compressed into a rod-like preform. Compression conditions are at a temperature of not higher than the melting point of the polymer and at a pressure of 0.1 MPa to 2 GPa and preferably 1 to 50 MPa. When coextrusion is desired, polyethylene and a different companion polymer are pressed together into a sheet of 0.1 to 2 mm in thickness under temperature and pressure conditions as is in pre-compression.

Solid-phase extrusion may be performed for example on an extruder provided with a cylinder and a die. After being placed in the cylinder, the particulate polyethylene or its compressed preform is extruded at above 20° C. and preferably higher than 90° C. but lower than the melting point of the starting polymer. In such instance pre-molding is done at from 20° to 130° C. and preferably 90° to 120° C. and at from 0.01 to 0.1 GPa. The extrusion ratio varies with the molecular weight of polymers, the type of catalysts and the condition of reactions but depends optionally on the diameter of dies. This ratio ranges usually from 2 to 100 times and preferably 3 to 50 times and more preferably 3 to 25 times.

Tensile stretching may be effected by nip or roll stretching at from 20° to 150° C. and preferably from 20° to 130° C. The speed of stretch depends on the molecular weight and composition of polymers, ranging usually from 1 to 100 mm/min and preferably from 5 to 50 mm/min. Nip stretching is particularly preferred. Single- or multi-pass stretching is by suitable choice possible.

The larger the draw ratio, the higher strength and the greater modulus. Polyethylene according to the invention is notably stretchable in a draw ratio of 20 to 60. Thus, by molding (1), polyethylene materials are obtainable in the form of fibers, films or sheets with a tensile elastic modulus of greater than 120 GPa.

Turning next to molding (2), rolling and subsequent stretching may be conducted under those temperature and pressure conditions stated in connection with extrusion and stretching in molding (1). One mode of rolling involves passing particulate polyethylene, at a solid phase without melting, through a pair of rolls rotating at varying peripheral speeds to thereby form a fiber, film or sheet. The rolling ratio is feasible over a wide range but generally at a rolling efficiency in the range of 1.2 to 30 and preferably 1.5 to 20 in terms of the lengths before and after rolling. Rolling is of a single- or multi-pass type. Mechanically strong polyethylene materials are likewise producible.

The crystal size characteristic peculiar to the polyethylene of the invention is determinable by the X-ray diffraction method for instance of Scherrer's equation $$D = \frac{K\lambda}{B \cos \theta}$$

where
- D: crystal size (Å)
- λ: X-ray wavelength
- θ: Bragg's angle
- B: integral multiple
- K: Scherrer's constant (K=1.05)

The crystal size of polyethylene is counted, from the above equation, by examining the particle spacing in a direction normal to a plane (110) in the diffraction pattern with the use of Cu Kα-rays of 1.5405 Å in wavelength as X-rays. The details as regards such size measurements are disclosed in "X-Ray Diffraction Method in Polymer Science". Leroy E. Alexander, John Wiley & Sons, Inc. (1969) and "X-Ray Diffraction of High Polymers", Masao Toda et al., Maruzen Co. (1968).

The invention will now be described by way of the following examples which are provided for purposes of illustration only.

EXAMPLE 1

Polyethylene Production

A 1-liter, three-neck flask equipped with an induction stirrer, a reflux condenser and an ethylene conduit was purged with nitrogen and charged with 500 ml of hexane, 3 mmol of triethylaluminum, anhydrous magnesium chloride, aluminum triethoxide and titanium tetrachloride. Ball milling was done for 16 hours, followed by addition of 30 mg of a given catalyst component and by subsequent heating at 50° C. with stirring. Ethylene was fed into hexane, and polymerization was continued at atmospheric pressure for 3.5 hours with unreacted monomer vented through the condenser out of the system.

On vacuum removal of hexane from the resulting polymer slurry, there was obtained 15 g of white polyethylene. The polymer showed an intrinsic viscosity of 15.6 dl/g at 135° C. in decalin.

Crystal Structure Determination

The resulting polymer was examined for its diffraction distribution of 15° to 27° at 2 θ to thereby determine the size of the crystals. A sample of the powder after being packed in a 2 mm deep holder was reflected on a goniometer. Measurement was made by an X-ray emitter (Rigaku Denki Co.) and also by a scintillation counter with Cu Kα-rays of Cuk rendered monochromatic on a graphite monochrometer and under the step scanning conditions of a step width of 0.02°, a preset time of 60 sec, an emitter slit of 0.5°, a receptor slit of 0.15 mm and a scatter slit of 0.5°.

A reflective profile of polyethylene among the diffractive profiles was substituted for the Scherrer equation to give a crystal size in a direction normal to a (110) plane in the diffraction pattern.

The integral multiple (B) was calculated in conventional manner; that is, on the assumption of a diffractive profile being represented as a sum of Gauss' and Cauchy's functions, such multiple was counted by the method of least squares with the actual diffractive profile coordinated with a stoichiometric curve in which $\alpha_1$- and $\alpha_2$-rays of Cuk were diffracted in a 2:1 ratio. The integral multiple of polyethylene counted was corrected as the one of a silicon powder on a plane (111) to preclude broadening caused by the tester employed The polymer according to the invention was identified to have a crystal size of 49 Å.

High Orientation by Stretching

The polymer obtained above was pressed at 130° C. and at 20 MPa into a 0.5 mm thick sheet from which a 6 mm×50 mm sample was taken. The sample was held in interposed relation to a polyethylene billet dimensioned to be 9.5 mm in diameter and 10 cm in length and scissed centrally longitudinally into two halves.

The billet was put into a capillary rheometer (Instron Inc.) equipped with a cylinder of 9.525 mm in inside diameter and also with a conical die of 4.8 mm in inside diameter, 10 mm in length and 20° in angle. Upon preheating at 110° C for 30 minutes, extrusion was done at 110° C. and at a speed of 0.06 cm/min. The extrudate was provided at a draw ratio of 4.8. Extrudability was adjudged by the ratio of an ink index marked on the sample and observed prior to and after molding.

The extrudate was thereafter stretched at 135°°C. and at a crosshead speed of 50 mm/min on a tensile tester equipped with a temperature-constant chamber. Molding was possible at a draw ratio as high as 26.

EXAMPLES 2 AND 3

The procedure of Example 1 was followed except for the use of polyethylenes of varied intrinsic viscosities and crystal sizes.

EXAMPLE 4

The polymer provided in Example 1 was pressed at 130° C. and at 0.02 GPa into a 0.5 mm thick film which was then passed at 135° C. through a pair of rolls each dimensioned to be 100 mm in diameter and 500 mm in crosswise length and allowed to counterrotate at different speeds There was obtained a film drawn at a draw ratio of 6.

The rolled preform was stretched under the same conditions as was in Example 1 after which a film was formed at a draw ratio 20.

COMPARATIVE EXAMPLE 1

The procedure of Example 1 was followed except that the polymer was replaced with Highfax 1900 (Highmont Co.). This polymer had an intrinsic viscosity of 23.3 dl/g and a crystal size of 70 Å on the (110) plane.

Extrusion was possible at a draw ratio of 5.2 and stretching only at a draw ratio of 14 and hence with insufficient modulus.

COMPARATIVE EXAMPLE 2

The procedure of Example 1 was followed except for the use of Hizex Million 240 (Mitsui Petrochemical Co.) with an intrinsic viscosity of 16.2 dl/g and a plane (110) of 140 Å. This polymer showed a sharp decline in extrusion and subsequent stretching.

COMPARATIVE EXAMPLE 3

The procedure of Example 1 was followed except for the use of Hoztalene GUR 412 (Hoechst AG) with an intrinsic viscosity of 15.3 dl/g and a plane (110) of 128 Å. The resulting extrudate was brittle in nature and impossible of stretching.

COMPARATIVE EXAMPLES 4 TO 6

Three commercial polymers as tested in Comparative Examples 1 to 3 were subjected to rolling in place of extrusion and then to stretching by the procedure of Example 4. Hizex Million and Hostalene grades on rolling produced too brittle films for stretching. A Highfax grade revealed reduced modulus.

TABLE

| run | intrinsic viscosity (dl/g) | crystal size on (110) plane (Å) | solid-phase extrusion or rolling | (draw ratio) | tensile strength (draw ratio) | stretch-ability (total draw ratio) | elastic modulus (GPa) |
|---|---|---|---|---|---|---|---|
| Example | | | | | | | |
| 1 | 15.7 | 49 | extrusion | 4.8 | 26 | 125 | 140 |
| 2 | 13.3 | 51 | extrusion | 4.9 | 23 | 113 | 132 |
| 3 | 19.9 | 57 | extrusion | 5.5 | 20 | 110 | 129 |
| 4 | 15.7 | 49 | rolling | 5.2 | 25 | 130 | 141 |
| Comparative Example | | | | | | | |
| 1 | 23.2 | 70 | extrusion | 5.2 | 14 | 73 | 106 |
| 2 | 16.2 | 140 | extrusion | 4.9 | 3.4 | 17 | 16 |
| 3 | 15.2 | 128 | rolling | 4.9 | — | — | — |
| 4 | 23.3 | 70 | rolling | 5.6 | 10 | 56 | 84 |
| 5 | 16.2 | 140 | rolling | — | — | — | — |
| 6 | 15.2 | 128 | rolling | — | — | — | — |

What is claimed is:

1. A process for producing a polyethylene material of high orientation, which comprises solid phaso-extruding a particulate polyethylene at a temperature of lower than the melting point thereof and subsequently stretching the resulting preform, said polyethylene having an intrinsic viscosity of from 5 to 50 dl/g at 135° C. in decalin and a crystal size of not more than 60 Å in a direction normal to a (110) plane in the diffraction pattern.

2. The process according to claim 1 further including compression of said polyethylene at a temperature of lower than the melting point thereof prior to extrusion.

3. The process according to claim 1 wherein said polyethylene is derived from homopolymerization or copolymerization with an α-olefin in the presence of a catalyst containing as a solid catalyst component a metallic compound of a Groups IV to VI metal.

4. The process according to claim 3 wherein said α-olefin is selected from the group consisting of propylene, butene-1, 4-methylpentene-1, hexene-1, octene-1, decene-1 and dodecene-1.

5. The process according to claim 3 wherein said metallic compound is selected from the group consisting of titanium, vanadium, chromium, zirconium and hafnium compounds and combinations thereof.

6. The process according to claim 1 wherein said polyethylene material has a tensile elastic modulus of greater than 120 GPa.

7. A process for producing a polyethylene material of high orientation, which comprises rolling a particulate polyethylene at a temperature of lower than the melting point thereof and subsequently stretching the resulting preform, said polyethylene having an intrinsic viscosity of from 5 to 50 dl/g at 135° C. in decalin and a crystal size of not more than 60 Å in a direction normal to a (110) plane in the diffraction pattern.

8. The process according to claim 7 further including compression of said polyethylene at a temperature of lower than the melting point thereof prior to rolling.

9. The process according to claim 3 wherein said homopolymerization or copolymerization is carried out at a pressure of 0 to 70 kg/cm$^2$G.

10. The process according to claim 2 wherein said compression is carried out at a temperature not higher than the melting point of said polymer and at a pressure of 0.1 MPa to 2 GPa.

11. The process according to claim 1 wherein said stretching is carried out at 20°-150° C. and at a rate of 5-50 mm/min.

12. The process according to claim 1 wherein said polyethylene material has a draw ratio of at least 20 and a total draw ratio of at least 110.

* * * * *